(12) United States Patent
Enke et al.

(10) Patent No.: US 9,327,581 B2
(45) Date of Patent: May 3, 2016

(54) METHOD AND DEVICE FOR REGULATING A STATIONARY CLIMATE CONTROL FOR A VEHICLE

(71) Applicant: Volkswagen Aktiengesellschaft, Wolfsburg (DE)

(72) Inventors: Lukas Enke, Berlin (DE); Sathyamoorthy Naresh, Leamington Spa (GB); Christoph Waeller, Braunschweig (DE); Viktor Bader, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/453,331

(22) Filed: Aug. 6, 2014

(65) Prior Publication Data

US 2015/0041113 A1      Feb. 12, 2015

(30) Foreign Application Priority Data

Aug. 6, 2013   (DE) .......................... 10 2013 215 473

(51) Int. Cl.
*G06F 7/00* (2006.01)
*B60H 1/00* (2006.01)

(52) U.S. Cl.
CPC ........ *B60H 1/00778* (2013.01); *B60H 1/00392* (2013.01); *B60H 1/00421* (2013.01); *B60H 1/00428* (2013.01); *B60H 1/00742* (2013.01); *B60H 1/00878* (2013.01)

(58) Field of Classification Search
CPC ........... B60H 1/00778; B60H 1/00421; B60H 1/00878
USPC ............................................ 701/36; 165/202
See application file for complete search history.

(56) References Cited

U.S. PATENT DOCUMENTS

| 6,470,960 | B2 | 10/2002 | Kampf et al. | |
| 8,612,075 | B2 | 12/2013 | Atluri et al. | |
| 2011/0127025 | A1* | 6/2011 | Bohme et al. | 165/202 |
| 2012/0112694 | A1 | 5/2012 | Frisch et al. | |
| 2013/0020864 | A1 | 1/2013 | Smajlovic et al. | |
| 2015/0191073 | A1* | 7/2015 | Bjorkerud et al. | 454/75 |

FOREIGN PATENT DOCUMENTS

| DE | 100 19 571 A1 | 10/2001 |
| DE | 10 2005 004 950 A1 | 8/2006 |
| DE | 10 2006 002 391 A1 | 7/2007 |

(Continued)

*Primary Examiner* — Luke Huynh
(74) *Attorney, Agent, or Firm* — Muncy, Geissler, Olds & Lowe, P.C.

(57) ABSTRACT

A method and device for regulating a stationary climate control system for a vehicle that includes at least one first energy source is provided. A first actual value of a climate parameter is determined from the interior of the parked vehicle, and a difference value is generated from the actual value and a reference value. In addition, a projected usage time is determined for the vehicle, wherein a time interval is determined from the current time and the determined projected usage time. A quantity of energy that is required to set to a desired value for the climate parameter is determined here based on the length of the time interval and the difference value, and the actual value for the climate parameter within the time interval is set to the desired value based on the required quantity of energy and the quantity of energy available from the first energy source.

11 Claims, 5 Drawing Sheets

(56) References Cited

FOREIGN PATENT DOCUMENTS

| DE | 10 2007 004 875 A1 | 8/2008 |
| DE | 10 2007 056 770 A1 | 6/2009 |
| DE | 10 2009 019 753 A1 | 11/2010 |
| DE | 10 2009 035 654 A1 | 2/2011 |
| DE | 10 2009 056 044 A1 | 6/2011 |
| DE | 10 2011 102 889 A1 | 12/2011 |
| DE | 10 2010 043 335 A1 | 5/2012 |
| DE | 10 2011 079 415 A1 | 1/2013 |

* cited by examiner

METHOD AND DEVICE FOR REGULATING A STATIONARY CLIMATE CONTROL FOR A VEHICLE

This nonprovisional application claims priority under 35 U.S.C. §119(a) to German Patent Application No. 10 2013 215 473.9, which was filed in Germany on Aug. 6, 2013, and which is herein incorporated by reference.

BACKGROUND OF THE INVENTION

1. Field of the Invention

This invention relates to a method for regulating a stationary climate control system for a vehicle that includes at least one first energy source.

2. Description of the Background Art

The climate in the interior of a vehicle typically can be affected by a plurality of climate control units. During extreme weather conditions in which the vehicle heats up or cools down when parked, climate control is desirable early on when the user has not yet returned to the vehicle so that optimal climate conditions are present in the vehicle when the user returns. In the case of automatic air conditioners, a specific temperature is often set and this temperature is to be maintained in the interior of the vehicle. Timers are typically employed that activate the air conditioners at specific clock times in order to activate the air conditioner or stationary heater even when no user is present.

DE 10 2007 004 875 A1 describes an air conditioner for the stationary climate control of a motor vehicle, which unit includes a fuel cell system to operate the unit and an output device to deliver system reports. The user can receive information through the output device that is located with the user externally to the vehicle about the temperature in the vehicle interior.

DE 102006 002 391 A1 describes a method for remotely controlling vehicle functions and for implementing diagnostic functions in vehicles. A transceiver is activated in this method first for the nearby range. The transceiver is then activated for the remote range only after no nearby-range link has been established. One mobile transceiver can be located here with the user, while one is located in the vehicle.

DE 10 2009 035 654 A1 describes a device for authenticating access to a vehicle. The device comprises a wireless module to exchange radio signals through a radio interface between vehicle and wireless module. The data here can include data that can be modified or generated through the user interface of the electronic device in regard to switching on and/or off a stationary air conditioner and/or stationary heater. In addition, a timer can be programmed for the stationary air conditioner or stationary heater.

DE 10 2007 056 770 A1 describes a ventilation and/or climate control system for a vehicle comprising an air intake duct. The intake of outside air can be controlled here by the fan as a function of the incoming solar radiation, outside temperature, and the time the vehicle is stationary. Activation of the system can preferably be effected whenever the user is found with the vehicle key in the vicinity of the vehicle. Remote activation by pressing a button is also possible.

DE 10 2009 019 753 A1, which corresponds to US 20120112694, and which describes a method of data communication between a service provider and a vehicle. The approach is to establish a communications link between the vehicle and the service provider only when the vehicle is connected to a charging station.

US 2011/0127025 A1 describes an air conditioner for a vehicle, which air conditioner [includes] a controller and at least one thermal processing element that is disposed in the passenger compartment of the vehicle along with at least one storage medium. The controller controls heating or cooling as a function of the outside temperature. The air conditioner can be controlled independently of the operating mode for the vehicle.

The disadvantage of the known stationary climate control systems, however, is that the stationary climate control does not take into account when the user is returning to the vehicle or whether he/she returns earlier or later than planned.

SUMMARY OF THE INVENTION

It is therefore an object of the present invention to provide a method and a device that ensures that a user of a vehicle will find a vehicle interior which has been climate-controlled according to his/her requirements upon his/her return to the vehicle after an extended absence from the vehicle.

The method according to an embodiment of the invention determines an actual value for a climate parameter from the interior of the parked vehicle. A difference value is generated from the actual value and a reference value. A projected usage time for the vehicle is furthermore determined, wherein a time interval is determined based on the current time and the determined projected usage time. In addition, a quantity of energy is determined based on the length of the time interval and the difference value, which quantity of energy is required to set to a desired value for the climate parameter, and the actual value of the climate parameter within the time interval is set to the desired value based on the required quantity of energy and the quantity of energy available from the first energy source. In particular, the reference value can be equal to the desired value.

A stationary climate control can be understood to refer to both the cooling and heating of the vehicle interior. The climate parameter can thus, in particular, relate to the temperature. Alternatively, the climate parameter can also be the air humidity.

The fact that a usage time is determined and set to a desired value based on the calculated time interval advantageously enables consideration to be given to the time at which optimal climate control of the vehicle interior should be effected. In known stationary climate control systems, an activation time is typically predetermined. This does not take into account the user's returning early or late to the vehicle. The determination of the usage time advantageously enables a climate control to be aligned precisely with this specified condition.

The fact that regulation is dependent on the required and available quantity of energy allows the stationary climate control system to allocate the available quantity of energy so that sufficient energy is available during the climate control operation.

In addition, it is understood that active climate control below refers not only to keeping a temperature constant but also to a modification of the climate parameter that is generated by activating the climate control units.

In an embodiment of the method according to the invention, a portion of the required quantity of energy is drawn from a second energy source whenever the required quantify of energy is greater than the quantity of energy available from the first energy source. This prevents a situation whereby the system simply shuts off and stationary climate control must be abandoned whenever the quantity of energy from the first energy source is insufficient for the stationary climate control.

In an embodiment of the method according to the invention, a determination is made based on the required quantity of energy whether the required quantity of energy may be drawn from the second energy source at the cost of a range parameter that is determined from the quantity of energy available from the second energy source. A portion of the required quantity of energy is then supplied from a third energy source based on the determination.

Energy sources that determine the range of a vehicle here are for example, gasoline or hydrogen in the case of fuel-driven vehicles. The energy source that determines the range of the vehicle in the case of electric vehicles is the traction battery. This embodiment advantageously precludes a situation whereby the stationary climate control system has an undesirable effect on the range of the vehicle.

In another embodiment of the method according to the invention, setting the climate parameter to the desired value is effected in two phases. In the first phase, a climate control is regulated so that the actual value of the climate parameter remains constant, or so that the variation from the desired value at least does not increase, where the duration of the first phase is a function of the length of the time interval. In the second phase, the actual value of the climate parameter is set to the desired value, wherein the start of the second phase is based on the difference between the actual value and the desired value for the climate parameter. A two-phase climate control is advantageous, in particular, because it is very energy-efficient. Here little energy is preferably consumed in the first phase during which the climate parameter is held constant. Keeping the climate parameter constant in the first phase thus prevents the interior of the vehicle from excessively heating up or cooling down. As a result, less energy is consumed in the second phase, during which the operation actively sets to the desired value, than if no first phase had taken place.

The first energy source can be a photovoltaic system, the second energy source is a traction battery, and/or the third energy source is an electrical-system battery. This is advantageous especially on sunny days. This is because the total energy can be supplied continually from the photovoltaic system without having to use energy from the traction battery or the electrical-system battery. Alternatively, the energy generated by the photovoltaic system in the stationary mode can be temporarily stored, then used for active climate control a few minutes before the user enters the vehicle. The traction battery and the electrical-system battery can then be conserved even when the weather changes during the stationary phase and continuous energy generation from the photovoltaic system is no longer possible.

In particular, the vehicle interior can be divided up into climate zones. A separate actual value is then determined for the climate parameter for each climate zone, and a separate difference value is generated from the separate actual value and a reference value. The actual value for each climate zone is then set within the time interval to a separate desired value. An energy requirement needed to set to the desired value is also determined for each climate zone separately based on the length of the time interval and the separate difference value. This enables the user to advantageously determine whether the climate control for a zone of the vehicle, such as, for example, the floor area, should be at a different setting than other zones of the vehicle. As a result, the user can advantageously adjust the climate control precisely to his/her needs.

In another embodiment of the method according to the invention, the stationary climate control system can be connected to an external server, through which the vehicle sends data to other networks and through which the vehicle receives data based on the sent data, wherein the operation to set to the desired value is additionally dependent on the received data. The sent data preferably include the location of the vehicle, the available quantities of energy from the energy sources, and/or a driving behavior of the user, while the received data include a weather report, traffic information, data from an appointment calendar of the user, location of the user, and/or information sent by the user to the vehicle. The received data can then be utilized in a scheduling plan for the stationary climate control system.

For example, the connection to the weather services enables information to be used, such as ambient temperature or specific solar radiation at the site of the vehicle to predict the temperatures that will occur inside the vehicle during the parking phase. Taking into account the predicted weather changes at the site, this information can be used to calculate any modification of the climate control output that is required during the time period. This advantageously allows energy reserves to be conserved since active cooling or heating of the vehicle interior is thus unnecessary. This is because active climate control generally consumes more energy than holding the climate parameter constant.

Access to traffic information provides better predictability of the required energy from the energy source governing the range. For example, determining travel time delays due to traffic problems enables an improved estimation to be made as to how much energy will still be needed for the rest of the trip from the energy source responsible for the range. It is furthermore also possible to take into account what quantity of energy will be required from the energy source responsible for the range in order to handle the routes between the locations at which the appointments are to occur that are entered in the appointment calendar of the user.

In particular, the climate parameter is the temperature in the vehicle interior, the reference value is the outside temperature found around the vehicle, and the desired temperature is preferably specified by the user or automatically determined based on experiential values from the past. Using the temperature here as the climate parameter is advantageous, in particular, since a vehicle generally already includes temperature sensors to measure the inside and outside temperatures. Sensors can thus be used that are already present in the vehicle. Alternatively, the reference value can also be the incoming solar radiation that strikes the vehicle. The vehicle can be heated up by this radiation at outside temperatures for which no climate control is actually necessary, with the result that climate control is desirable.

The invention relates furthermore to a device for regulating a stationary climate control system for a vehicle comprising at least one climate control unit, a first energy source, a sensing unit, query unit, an arithmetic unit, and a control unit. An actual value for a climate parameter from the vehicle interior can be measured by the sensing unit. The arithmetic unit generates a difference value from the actual value and a reference value. The query unit determines the projected usage time for the vehicle, determines a time interval from the current time and the determined projected usage time, and determines a quantity of energy required to set to a desired value based on the length of the time interval and the difference value. Finally, the control unit activates the climate control unit so as to set the actual value of the climate parameter within the time interval to the desired value based on the required quantity of energy and the quantity of energy available from the first energy source. The device is capable, in particular, of implementing the method according to the invention and thus has the following advantages of the method.

In particular, the climate control unit can include a plurality of fans that control the ventilation level, heaters for the air inside the vehicle, or for the air supplied to the interior of the vehicle, window heaters, and/or seat heaters.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
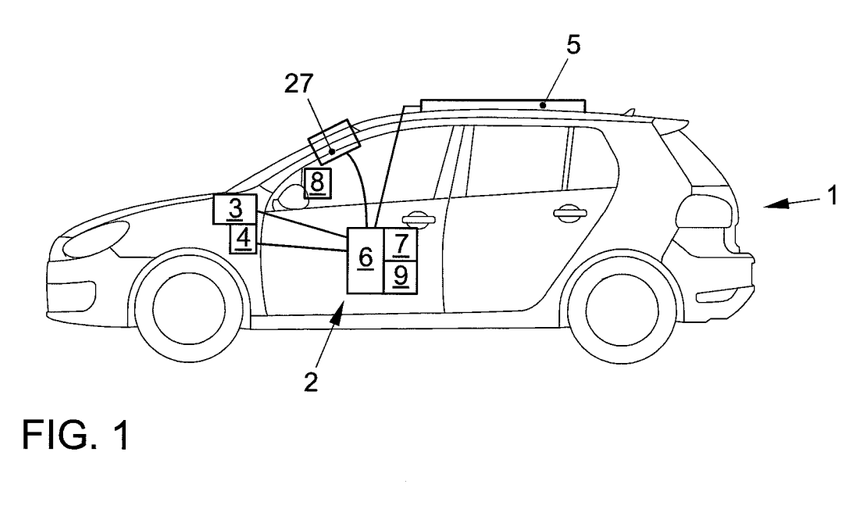
FIG. 1 is a side view of a vehicle according to an embodiment of the device according to the invention.

An embodiment of a device 2 according to the invention that is disposed in a vehicle 1 will be described with reference to FIG. 1. Vehicle 1 relates here to an electric vehicle. Device 2 according to the invention includes an electrical-system battery 3 that ensures that the electrical system is supplied with electrical power and is a conventional 12 volt battery, a traction battery 4 that functions as the energy source to drive electric vehicle 1, and a photovoltaic system 5 that is installed on the roof of vehicle 1.

A plurality of climate control units 8 are disposed in the interior of vehicle 1. These are, for example, fans that control the ventilation level, heaters for the air in the interior of the vehicle and for the air supplied to the interior of vehicle 1, window heaters, seat heaters, and/or an air conditioner to cool the vehicle interior. These are furthermore distributed around the interior of vehicle 1 to enable the climate control to be varied in different zones of vehicle 1. Climate control units 8 are connected through a control system 6 to electrical-system battery 3, traction battery 4, and photovoltaic system 5. An arithmetic unit 7 and a query unit 9 are integrated in control system 6. One or more look-up tables are stored in arithmetic unit 7 that is integrated in control system 6. These look-up tables contain entries that can be retrieved from the table to control the desired value of a climate parameter.

The device according to the invention furthermore includes a temperature sensor 27 that can measure the temperature both in the interior of vehicle 1 and the outside temperature found around vehicle 1.

Query unit 9 in this embodiment is designed to determine values that have been entered in the look-up tables. Query 9 furthermore includes an interface that is provided in the form of a WLAN node (not shown).

Figure 2:
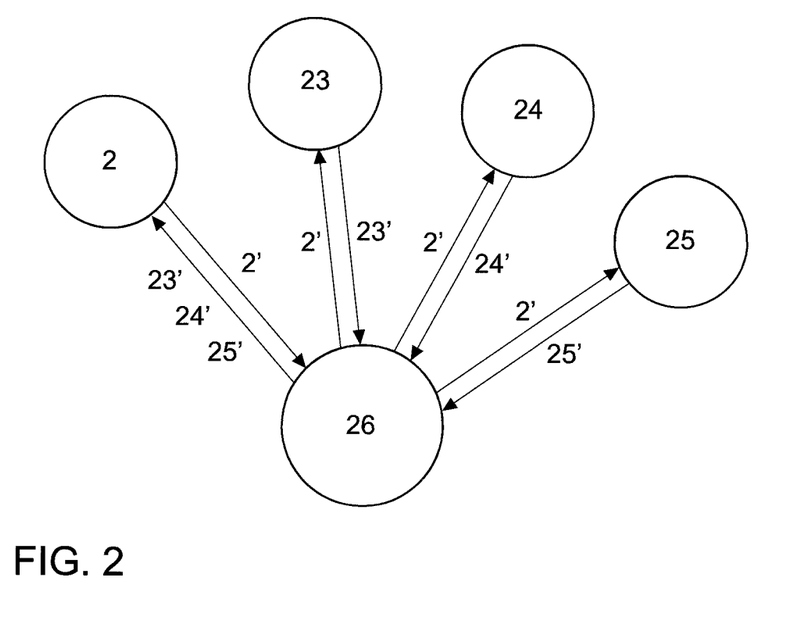
FIG. 2 is a schematic view illustrating an exchange of data through an external server between the device and other services.

FIG. 2 depicts an embodiment in which device 2 according to the invention is connected to an external server 26. External server 26 in turn is connected to various services 23, 24, and 25. Here service 23 represents a weather service, service 24 represents the mobile telephone of the user, while service 25 represents a traffic service.

Device 2 can now send data 2' from vehicle 1 to external server 26 through the interface integrated in query unit 9. Server 26 relays these data 2' to services 23, 24, and 25. Data 2' indicates the location of vehicle 1, the available electrical power of photovoltaic system 5, and/or the driving behavior of the user. In addition, data 2' can also include specific inquiries to the user. These data 2' are evaluated by other services 23, 24, and 25, and appropriate data 23', 24', and 25' are sent back through external server 26 to device 2.

Data 23' here include a weather forecast for the location of vehicle 1. This enables device 2, based on the forecast, to better allocate the energy required for the stationary climate control. Data 24' here can be data that the user himself/herself sends to device 2 through external server 26. This can be, for example, the time when the user returns to vehicle 1, that is, the usage time. Alternatively, this data 24' can also come from the user's appointment calendar. If addresses at which the appointments are to occur are also stored along with the appointments, device 2 can determine a range that is needed to reach the locations at which the appointments are to occur. This provides more efficient energy management of the quantities of energy available in energy sources 3, 4, and 5. Data 25' from the navigation service can include a traffic report. This enables device 2 to be notified of longer transit times for vehicle 1 to the destination point of the user. This is also advantageous in terms of managing the quantities of energy from energy sources 3, 4, and 5 for the stationary climate control.

Figure 3:
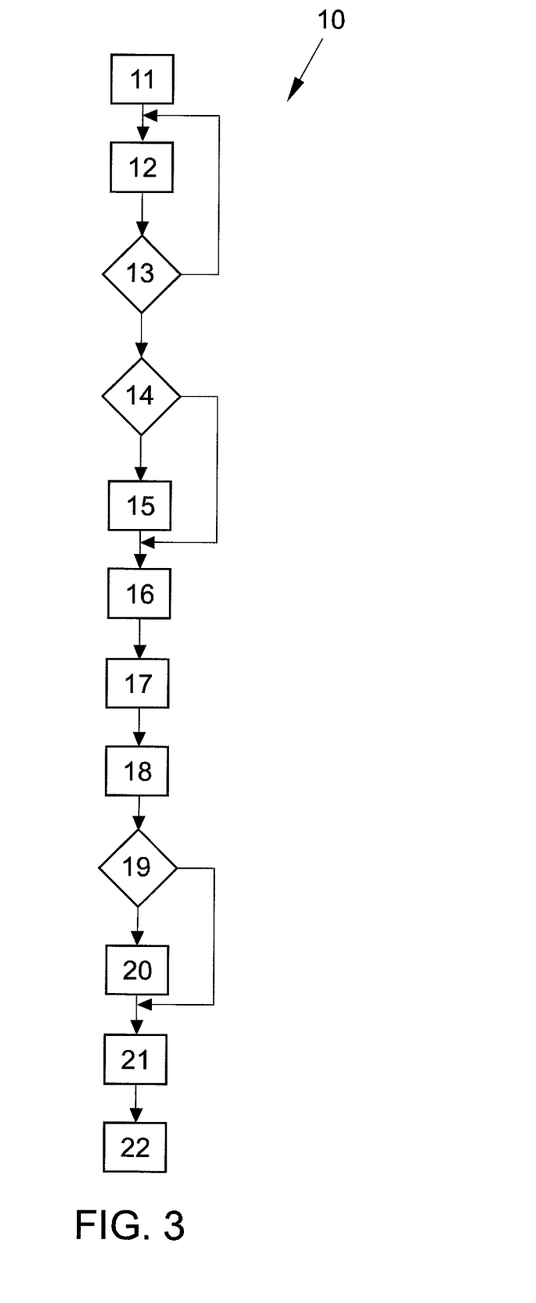
FIG. 3 is a flow diagram illustrating the functional sequence of an embodiment of the method according to the invention.

A first embodiment of an operational sequence for method according to the invention 10 is described with reference to FIG. 3. This describes how device according to the invention 2 cools the interior of parked vehicle 1. Device 2 here can furthermore access mobile telephone 24 of the user.

Method 10 according to the invention starts with step 11 as vehicle 1 is parked in the sun and the user leaves vehicle 1. The user activates device 2 before leaving vehicle 1.

In step 12, temperature sensor 27 measures the temperature in the interior of vehicle 1 and also the temperature that is found around vehicle 1, that is, the outside temperature. The interior temperature here is associated with an actual value $T_{ist}$ and the outside temperature is associated with a reference value $T_{ref}$.

In step 13, a difference value $\Delta T$ is generated from $T_{ist}$ and $T_{ref}$ ($\Delta T = T_{ist} - T_{ref}$).

If $\Delta T < 0$, no climate control is initiated by climate control units 8. The process is started again with step 12 after a given period of time, for example, after 5 minutes.

If $\Delta T > 0$, however, step 14 determines the projected usage time, that is, the time at which the user is projected to return to vehicle 1. Reference is made for this purpose to the look-up table to check whether the user has left a corresponding entry for the time of his/her return.

If it is found that the user has not left any entry, the process moves on to step 15. In step 15, a message is sent to mobile telephone 24 of the user inquiring about the return time. From the answer given by the user, which can be a time report in a predetermined format, device 2 then extracts the return time. The process then continues with step 16 of method 10.

If the user has left an entry, detection device 9 then extracts the clock time from a corresponding field in a look-up table. Step 15 is omitted and the process immediately continues with step 16.

In step 16, a desired temperature value $T_{soll}$ to be set is determined for the vehicle interior. It is possible here again to use a value entered by the user. If the user has not entered any desired temperature value $T_{soll}$, a value to be set can be determined based on experiential values. What is primarily used here are values that have been set in the past.

A determination is subsequently made in step 17 of the output that is needed to cool the interior of vehicle 1 to desired temperature to be set $T_{soll}$. To this end, temperature differences $\Delta T_{ist\text{-}soll}$ are stored in a look-up table that represent $|T_{ist}-T_{soll}|$, and output values are stored in the form of value pairs. That output value is thus looked up in the table which is required, for example, to cool $\Delta T=10°$ C. within a given time interval.

Step 18 then determines the quantity of energy available from photovoltaic system 5. This is highly dependent on the prevailing weather conditions. Vehicle 1 in this example has been parked in the sun. Energy is thus available continuously from photovoltaic system 5.

In step 19, the time interval $\Delta t$ is then computed within which the temperature should be set to desired value $T_{soll}$. This time interval $\Delta T$ is determined by generating the difference between the usage time and the current time. The process continues with step 20 or step 21 depending on the length of time interval $\Delta T$.

Step 20 is triggered when, for example, time interval $\Delta T$ is, for example, 10 minutes long. A first phase of climate control is triggered in step 20. Specifically, this means here that the stationary ventilation is activated that is run on energy from photovoltaic system 5. This prevents any further warming of the vehicle interior. Subsequently, a second phase of climate control is triggered in step 21 a few minutes early, for example, 5 minutes early, before the end of time interval $\Delta T$. The vehicle interior is then actively cooled down by activating the air conditioner to $T_{soll}$. The start of phase 2 is dependent here on $\Delta T_{ist\text{-}soll}$. Phase 2 becomes longer in duration as $\Delta T_{ist\text{-}soll}$ increases.

If time $\Delta t$ is short, for example, less than 10 minutes, step 20 is omitted and step 21 is triggered, that is, activation of air conditioner 8.

The process ends with step 22 when the user returns to vehicle 1.

Figure 4:
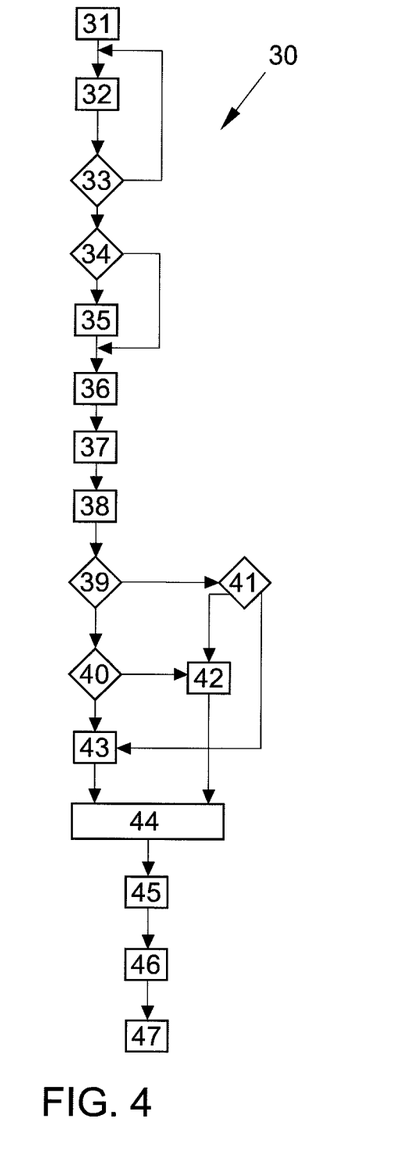
FIG. 4 is a flow diagram illustrating the functional sequence of an embodiment of the method according to the invention.

A second embodiment of method 30 according to the invention is described with reference to FIG. 4. Here the sky is cloudy.

Steps 31 through 37 correspond here to steps 11 through 17 in method 10.

Step 38 determines the quantity of energy available from photovoltaic system 5. When the sky is cloudy, the energy yield from photovoltaic system 5 is lower than with direct incoming solar radiation. Query unit 9 in this embodiment determines that the energy generated by photovoltaic system 5 is insufficient to cool the interior of vehicle 1 to the wanted desired value $T_{soll}$.

Step 39 determines whether the user manually entered a response to the question whether the stationary climate control should operate at the cost of the range for vehicle 1. For this purpose the look-up table is checked as to whether any relevant entry is found. The process continues with step 40 or 41 depending on whether or not an entry is found.

If an entry is found, the process continues with step 40. The content of the entry is checked in step 40.

If the user has answered "yes", the process continues with step 42. In step 42, the energy required for the stationary climate control from traction battery 4 is supplied, whereby the battery's available quantity of energy determines the range of vehicle 1.

If the user answered "no", the process continues with step 43. In step 43 device 2 cannot now supply the required quantity of energy either from photovoltaic system 5 or from traction battery 4. It selects a range-neutral climate control and supplies the required quantity of energy from electrical-system battery 3.

If device 2 in step 39 finds no entry in the look-up table, device 2 in step 41 sends an inquiry to the user's mobile telephone 24. This inquiry asks the user whether the stationary climate control may operate at the cost of range. The inquiry indicates, in particular, by how many kilometers the range of vehicle 1 would be reduced.

Depending on the user's response, the process also then continues with steps 42 or 43. If the user answers "yes", the process continues with step 42. If the user answers "no", the process continues accordingly with step 43.

If device 2 does not receive any response from the user, this is treated as a "no". Device selects a range-neutral climate control and continues with step 43. One possible approach here is for the device to wait 5 minutes for the user's response based on a previous setting before the device starts the climate control.

The following steps 44 through 46 correspond to steps 19 through 21 of method 10.

The process ends in step 47 when the user returns to the vehicle.

If device 2 is not connected to external server 26 and therefore cannot send inquiries to the user, activation of device 2 can now only be effected in steps 11 through 31 of methods 10 and 30 if the user has entered the requested values manually upon activation.

In the event the weather suddenly changes during the stationary period so that photovoltaic system 5 can no longer supply sufficient energy, device 2 can detect this during the stationary climate control operation. However, the climate control is not simply turned off, but instead the other available energy sources 3 and/or 4 are used. Alternatively during the stationary phase, unused electrical energy from photovoltaic system 5 can be stored in a temporary storage device. This energy can then be used instead of the energy from electrical-system battery 3 or traction battery 4.

Figure 5:
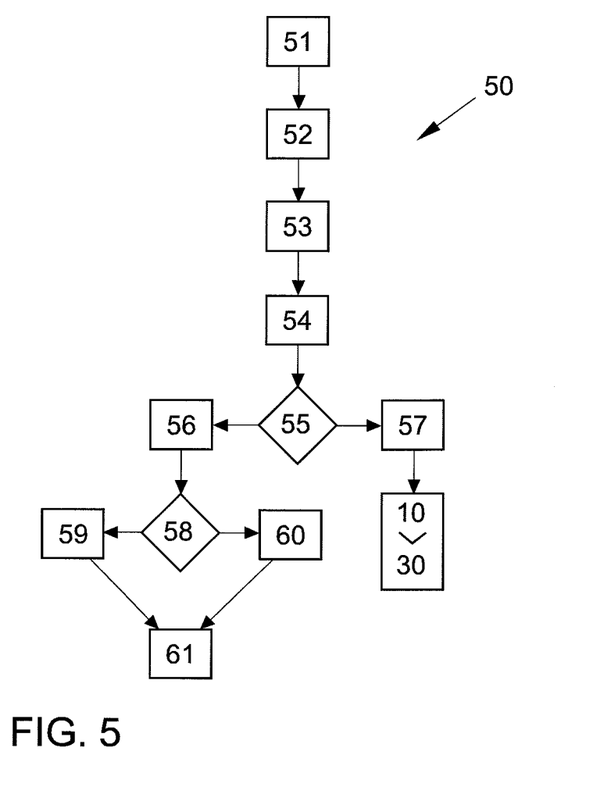
FIG. 5 is a flow diagram illustrating the functional sequence of an embodiment of the method according to the invention.

Another embodiment of the method according to the invention is described with reference to FIG. 5. Here data 23' from weather service 23 that was sent through external server 26 to device 2 is utilized in regulating the stationary climate control.

Step 51 here corresponds to step 11 and step 31 of the above-described methods 10 and 30.

In step 52, device 2 sends the location of vehicle 1, which is located through the "Global Positioning System" (GPS), to external server 26. This server relays the position to a weather service 23. Weather service 23 uses the position to generate a weather forecast for the location and sends this back to external server 26, which relays the weather forecast to device 2.

In step 53, the weather forecast, primarily the temperature and the incoming solar radiation, are relayed to arithmetic unit 6. This unit then simulates the trend for the actual value $T_{ist}$ in the interior of vehicle 1 based on the time forecast by the weather service.

In step 54 by means of steps of above-described methods 10 and 30, the usage time is determined based on steps 14 and 15, or 34 and 35, while time interval ΔT is determined based steps 19 or 44.

Step 55 then determines if stationary climate control will be needed during time interval ΔT. This is the situation primarily whenever forecast temperature $T_{prog}$ in the interior of vehicle 1 exceeds reference value $T_{ref}$ for the projected usage time. A difference value $\Delta T_{prog}$ is accordingly generated from $T_{prog}$ and $T_{ref}$.

If $\Delta T_{prog} < 0$, methods 10 and 30 can follow—omitting, however, steps 14 and 15, or 34 and 35 as well as steps 19 or 44, since the usage time and the time interval ΔT have already been determined in step 54.

If $\Delta T_{prog} > 0$, step 56 determines an output that is needed to hold $T_{ist}$ constant. This can be affected according to steps 17 or 37 of above-described methods 10 and 30.

Step 58 then determines if the quantity of energy available from photovoltaic system 5 is sufficient to hold $T_{ist}$ constant.

If this quantity is sufficient, vehicle interior temperature $T_{ist}$ is held constant at its current value in step 59. This value in the present example corresponds to the desired value since method 50 is immediately initiated when the user leaves previously climate-controlled vehicle 1.

If this quantity is not sufficient, step 60 determines if energy source 3 or 4 should be used for the stationary climate control. This occurs according to steps 39 through 42 in method 30.

Method 50 is especially energy-efficient since no active cooling by the air conditioner is necessary. All that is required is a constant small quantity of energy in order to maintain the temperature value at its current value which corresponds to desired value $T_{soll}$.

Data 25' from traffic service 25 can be utilized in the decision whether a required quantity of energy can be supplied from traction battery 4. If device 2 receives data 25' from the traffic service about traffic congestion along the user's route, this would entail delays in the travel time. This in turn affects the quantity of energy available in traction battery 4. As a result, device 2 will not consider supplying energy from traction battery 4 whenever significant traffic delays can be anticipated along the user's route. No inquiry to the user is then required as to whether energy from traction battery 4 may be drawn at the cost of range.

All three methods 10, 30, and 50 comprise the approach whereby device 2 can send new inquiry to the user and request a new usage time if the user returns to vehicle 1 later than indicated. If this time is in the immediate future, the temperature that has been set to desired value $T_{soll}$ can be held constant. If this time lies further in the future, such as, for example, 2 hours, the method is restarted.

The device can locate the position of the user in order to preclude a situation whereby the stationary climate control action has not yet been completed when the user returns early to vehicle 1. If the user is approaching the vehicle, the output of the air conditioner is increased so as to reach desired value $T_{soll}$ more quickly.

The user can continue to allocate different desired values $T_{soll}$ to individual climate zones. The floor area of the user can thus be provided with a temperature that is different from the floor area on the passenger side. This enables a climate to be set for each vehicle occupant which is tailored to him/her.

Alternatively or additionally, the interior of vehicle 1 can be heated by the method according to the invention—in particular, of course, in winter.

In addition, the method can also be implemented in vehicles that are not electric vehicles. In this case energy can be supplied from the fuel used, such as, for example, gasoline or hydrogen, instead of from traction battery 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for regulating a stationary climate control system for a vehicle that includes at least one first energy source, the method comprising:
   determining an actual value of a climate parameter from an interior of the vehicle;
   generating a difference value from the actual value and a reference value;
   determining a projected usage time for the vehicle;
   determining a time interval from a current time and the determined projected usage time;
   determining a quantity of energy required to set the climate parameter to a desired value based on a length of the time interval and the difference value; and
   setting the actual value for the climate parameter within the time interval to the desired value based on the required quantity of energy and the quantity of energy available from the first energy source.

2. The method according to claim 1, wherein a portion of the required quantity of energy is supplied from a second energy source when the required quantity of energy is greater than the quantity of energy available from the first energy source.

3. The method according to claim 2, wherein a determination is made based on the required quantity of energy, whether the required quantity of energy may be drawn from a second energy source at the cost of a range parameter that is determined from the quantity of energy available from the second energy source, and a portion of the required quantity of energy is then supplied from a third energy source based on the determination.

4. The method according to claim 3, wherein the first energy source is a photovoltaic system, the second energy source is a traction battery, and/or the third energy source is an electrical-system battery.

5. The method according to claim 1, wherein setting the climate parameter to the desired value is effected in two phases:
   in a first phase, a climate control is regulated so that the actual value of the climate parameter remains constant, wherein the duration of the first phase is dependent on the length of the time interval; and
   in a second phase, the actual value of the climate parameter is set to the desired value, wherein the start of the second phase is dependent on a difference between the actual value and the desired value of the climate parameter.

6. The method according to claim 1, wherein the vehicle interior is divided up into climate zones, wherein a separate actual value for the climate parameter is determined for each climate zone and a separate difference value is generated based on the separate actual value and the reference value, wherein the actual value for each climate zone is set separately within the time interval to a separate desired value, wherein a quantity of energy required to set to the desired value is determined for each climate zone separately depending on the length of the time interval and the separate difference value.

7. The method according to claim 1, wherein the stationary climate control system is connected to an external server through which the vehicle sends data to services, and through which the vehicle receives data based on the sent data, and wherein regulation setting to the desired value is additionally dependent on the received data.

8. The method according to claim 7, wherein the sent data include the location of the vehicle, the available quantity of energy from the energy sources, and/or the driving behavior of the user, wherein the received data include a weather report, traffic information, data from an appointment calendar of the user, location of the user, and/or information sent by the user to the vehicle.

9. The method according to claim 1, wherein the climate parameter is the temperature in the vehicle interior, wherein the reference value is the outside temperature found around the vehicle, and wherein the desired value is specified by the user or is determined automatically based on experiential values from the past.

10. The method according to claim 1, wherein the vehicle is a parked vehicle.

11. A device for regulating a stationary climate control system for a vehicle, the device comprising:
   at least one climate control unit;
   a first energy source;
   a sensing unit via which an actual value of a climate parameter is measured in an interior of the vehicle;
   an arithmetic unit that generates a difference value from the actual value and a reference value for the climate parameter;
   a query unit that determines a projected usage time for vehicle, determines a time interval from a current time and a determined projected usage time, and determines a quantity of energy required to set the climate parameter to a desired value; and
   a control unit that sets the actual value for the climate parameter within the time interval by activation of the climate control unit to the desired value based on the required quantity of energy and the quantity of energy available from the first energy source.

\* \* \* \* \*